United States Patent
Chin

[19]

[11] Patent Number: 6,140,782
[45] Date of Patent: Oct. 31, 2000

[54] BRUSHLESS DC FAN DRIVER WITH OVERSHOOT VOLTAGE PREVENTION AND ENHANCED OPERATIONAL EFFICIENCY

[75] Inventor: Shu-Yuan Chin, Hsin-Chu, Taiwan

[73] Assignee: Silicon Touch Technology Inc., Taiwan

[21] Appl. No.: 09/287,399

[22] Filed: Apr. 6, 1999

[51] Int. Cl.[7] ..................................................... H02P 7/00
[52] U.S. Cl. ......................... 318/254; 318/138; 318/439
[58] Field of Search .................................... 318/138, 245, 318/254, 439, 434; 388/803, 811, 815; 73/1.41, 1.84, 862, 322, 326; 324/207.13, 207.14, 207.15, 207.2, 207.25, 251.225; 327/511

[56] References Cited

U.S. PATENT DOCUMENTS

| | | | |
|---|---|---|---|
| 4,966,041 | 10/1990 | Miyazaki | 73/862.191 |
| 5,218,279 | 6/1993 | Takahashi et al. | 318/560 |
| 5,250,881 | 10/1993 | Yoshino | 318/254 |
| 5,444,369 | 8/1995 | Luetzow | 324/207.2 |
| 5,493,216 | 2/1996 | Asa | 324/207.2 |
| 5,550,469 | 8/1996 | Tanabe et al. | 324/251 |
| 5,574,608 | 11/1996 | Fukuoka | 361/23 |
| 5,598,074 | 1/1997 | Huang | 318/439 |
| 5,604,412 | 2/1997 | Okada et al. | 318/254 |
| 5,694,040 | 12/1997 | Plagens | 324/207.2 |
| 5,734,241 | 3/1998 | Okada et al. | 318/254 |
| 5,747,952 | 5/1998 | Izawa et al. | 318/135 |
| 5,804,936 | 9/1998 | Brodsky et al. | 318/254 |
| 5,901,268 | 5/1999 | Ando et al. | 318/439 |
| 6,020,700 | 2/2000 | Tien | 318/254 |
| 6,023,136 | 2/2000 | Pinewski | 318/254 |

*Primary Examiner*—Paul Ip
*Attorney, Agent, or Firm*—Gardere & Wynne, L.L.P.; Sanford E. Warren, Jr.

[57] ABSTRACT

A fan driver is provided to drive a DC brushless fan. The fan driver has a pulse generator for receiving a signal indicating the phase of a rotor in the fan from a Hall element and generating two pulse signals whose phases are inverted by about 180°. Two driving units activated by the two pulse signals, respectively, are provided to alternatively apply current to the two coils thereby generating magnetic fields to rotate the rotor of the fan. Two switch elements are connected to the two driving units so that anti-electromotive voltage generated by one of the two coils can be transferred to the other coil.

11 Claims, 7 Drawing Sheets

BRUSHLESS DC FAN DRIVER WITH OVERSHOOT VOLTAGE PREVENTION AND ENHANCED OPERATIONAL EFFICIENCY

BACKGROUND OF THE INVENTION

1. Field of the Invention

The present invention relates to a brushless DC fan driver, more particularly, to a brushless DC fan driver capable of utilizing anti-electromotive voltages to enhance the operational efficiency of the DC fan and prevent overshoot voltage problems.

2. Description of Related Art

FIG. 8 shows a conventional brushless DC fan driver for controlling a brushless DC fan that has two phase coils L1 and L2. The brushless DC fan driver has a Hall sensor (1), an amplifier (2) connected to the Hall sensor (1), a pulse generator (3) connected to the output of the amplifier (2) and two driving units (4, 5) connected to the pulse generator (3). The first driving unit (4) is composed of transistors Q11 and Q12 in Darlington connection. The second driving unit (5) is likely composed of transistors Q13 and Q14 in Darlington connection. A Zener diode Z1 is connected between the base and collector of the transistor Q11, while another zener diode Z2 is connected between the base and collector of the transistor Q13. The output terminals (6, 7) of the two driving units (4, 5) are connected to the two coils L1 and L2 of the fan. The two coils L1 and L2 are further connected to the power source VCC via a diode.

In use, when the fan is powered on, the pulse generator (3) generates a pulse signal to turn on the first driving unit (4) so that current is applied to coil L1 thereby generating a magnetic field to rotate a rotor (not shown) of the fan. Then, the Hall sensor (1) detects the change of magnetic polarity caused by the rotation of the rotor thereby generating a voltage signal to the pulse generator (3) via the amplifier (2). Consequently, the phase of the pulse signal generated by the pulse generator (3) is reversed to turn off the first driving circuit (4) and turn on the second driving circuit (5) thereby applying current to coil L2. Coil L2 generates a magnetic field to further rotate the rotor. Accordingly, the two driving units (4, 5) are alternatively turned on and turned off to apply current to the two coils L1 and L2, respectively, thereby continuously rotating the rotor.

Because anti-electromotive overshoot voltages may be generated by coils L1 and L2 at the instant when the current to coils L1 and L2 stops, the two Zener diodes Z1 and Z2 are provided to prevent such an overshoot voltage problem. The Zener diodes Z1 and Z2 bypass the overshoot voltages to protect the driving units (4, 5) from the overshoot voltages. However, instead of simply bypassing the overshoot voltages, it is desired to use the overshoot voltages to promote the operational efficiency of the fan.

Furthermore, in the standard CMOS configuration, Zener diodes are not available. Therefore, Zener diodes can not be integrated with a fan driver fabricated with a CMOS configuration. Consequently, the conventional fan driver is not satisfactory, and there is a need to have an improved fan diver which can mitigate and/or obviate the aforementioned problems.

SUMMARY OF THE INVENTION

The objective of the present invention is to provide a fan driver for driving a DC brushless fan. The fan driver not only prevents damage caused by anti-electromotive voltage but also utilizes anti-electromotive voltage to promote the operational efficiency of the DC fan.

To achieve the objective, the fan driver of the present invention has a pulse generator for receiving a signal indicating the phase of the rotor in the fan from a Hall element and generating first and second pulse signals of which phases are inverted by about 180°. First and second driving units activated by said first and second pulse signals respectively, are provided. The first driving unit has an output terminal connected to the first coil of the fan. The second driving unit has an output terminal connected to the second coil of the fan. The first and second driving units are alternatively turned on and off such that the first and second coils of the fan are alternatively supplied with current thereby generating magnetic fields to rotate the rotor of the fan. A first switch element is connected between the output terminal of the first driving unit and a power source. A second switch element is connected between the output terminal of the second driving unit and the power source. With the use of the first and second switch elements, anti-electromotive voltage generated by one of the first and second coils can be transferred to the other coil.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
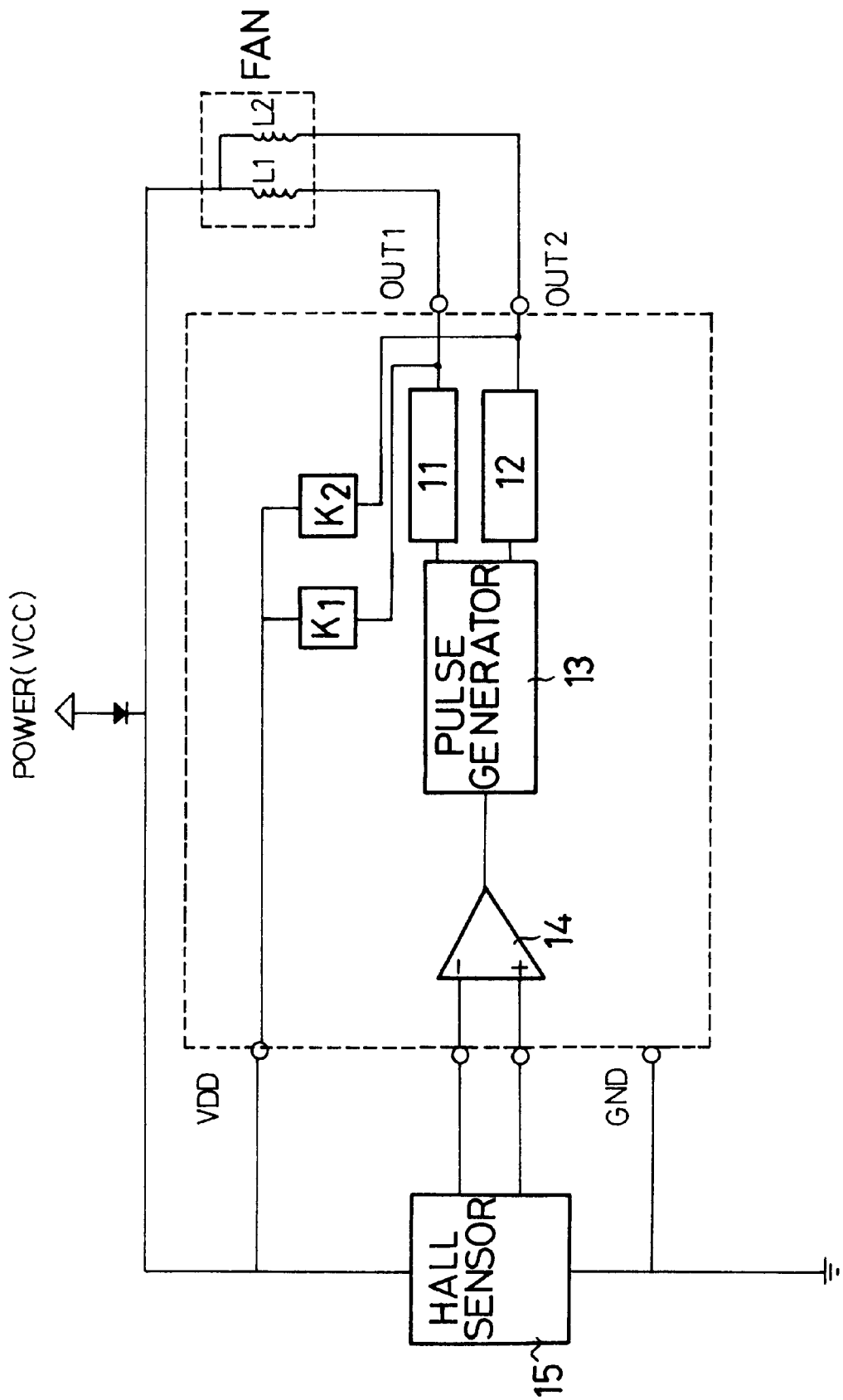
FIG. 1 is a circuit diagram of a preferred embodiment of the fan driver in accordance with the present invention.

FIG. 1 shows the circuit structure of a fan driver in accordance with the present invention, which includes an amplifier (14), a pulse generator (13), two driving units (11, 12) and two switch elements (K1, K2). A Hall sensor (15) is provided to determine the rotating phase of a rotor (not shown) in the fan driven by the fan driver. The amplifier (14) is connected to the Hall sensor (15) to amplify the output signal from the Hall sensor (15). The pulse generator (13) is connected to the output of the amplifier (14) to generate two pulse signals of which phases are inverted by about 180° for activating the two driving units (11, 12). Switch element K1 is connected between the output of driving unit 11 and the power source VDD, and switch element K2 is connected between the output of driving unit 12 and the power source VDD. The two driving units (11, 12) are adapted to connect to the two coils L1 and L2 of the fan at two output terminals OUT1 and OUT2, respectively. The two coils L1 and L2 are further connected to a fan power source VCC via a diode.

In operating the fan driver as shown in FIG. 1, the Hall sensor (15) detects the phase of the rotor in the fan and generates a corresponding voltage signal to the amplifier (14) to be amplified. Based on the amplified signal, two pulse signals whose phases are inverted by about 180° are generated. When the pulse signals turn on the driving unit 11 and turn off the driving unit 12, current flows through the coil L1 thereby generating a magnetic field to rotate the rotor of the fan. Then, the Hall sensor (15) detects the change of magnetic polarity caused by the rotation of the rotor thereby generating a voltage signal to the pulse generator (13) via the amplifier (14). Consequently, the phase of the pulse signal generated by the pulse generator (3) is reversed to turn off the driving circuit 11 and turn on the driving circuit 12 thereby applying current to coil L2. Coil L2 generates a magnetic field to further rotate the rotor. Accordingly, the two driving units (11, 12) are alternatively turned on and turned off to apply current to the two coils L1 and L2, respectively, thereby continuously rotating the rotor.

Two switch elements K1 and K2 are provided to transfer overshoot voltage generated by one of the coils (L1, L2) corresponding to the driving unit (11, 12) that is turned off to the coil (L1, L2) corresponding to the other driving unit (11, 12) that is turned on. Therefore, the operational efficiency of the fan is promoted and the fan driver is protected from the overshoot voltage.

Figure 2:
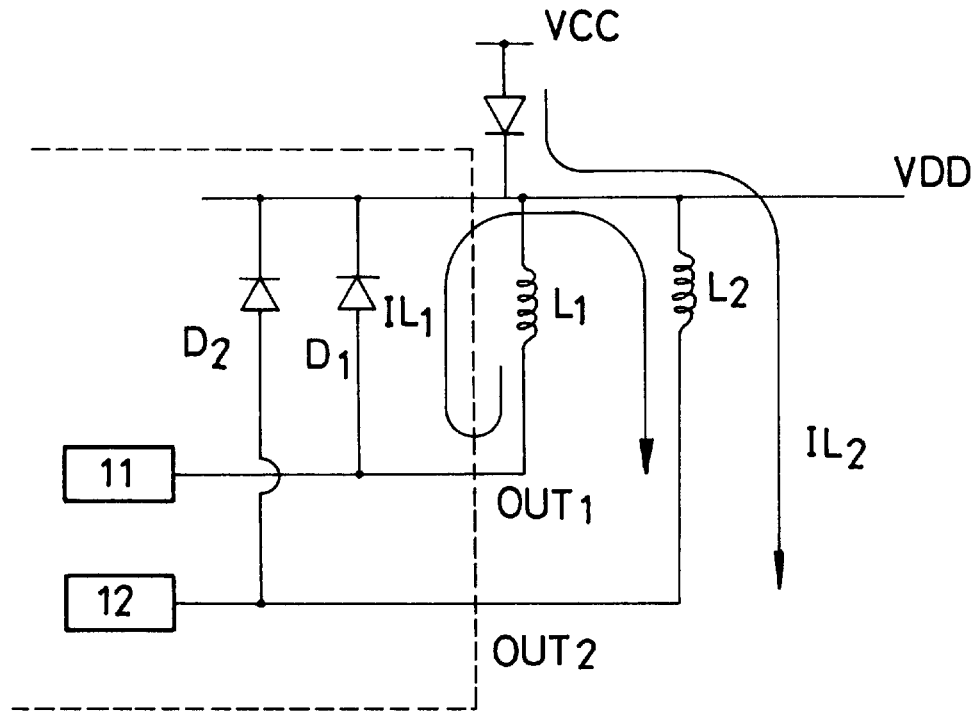
FIG. 2 illustrates the operation of the fan driver when diodes are used to implement the switch elements in FIG. 1.

The switch elements K1 and K2 can be implemented with diodes, electronic switches or transistors (such as PNP or PMOS transistors). With reference to FIG. 2, the switch elements K1 and K2 are implemented with diodes D1 and D2, respectively. In operation, when driving unit 11 is turned off and driving unit 12 is turned on, current IL2 flows through coil L2. The path of the current flow is indicated by an arrow line (VCC→VDD→L2→driving unit 12→GND). At the same time, coil L1 may generate anti-electromotive voltage so that current IL1 flows through coil L1. The path of the current flow is indicated by an arrow line (L1→D1→VDD→L2→driving unit 12→GND).

When driving unit 12 is turned off and driving unit 11 is turned on, current IL1 flows through coil L1. The path of the current flow is indicated by an arrow line (VCC→VDD→L1→driving unit 11→GND). At the same time, coil L2 may generate anti-electromotive voltage so that current IL2 flows through coil L2. The path of the current flow is indicated by an arrow line (L2→D2→VDD→L1→driving unit 11→GND).

In accordance with the above analysis, it is obvious that the anti-electromotive voltage generated by one of the coils (L1, L2) does not damage a corresponding driving unit (11, 12). Further, the anti-electromotive voltage is transferred to the other coil (L1, L2) thereby promoting the operational efficiency of the fan.

Figure 3:
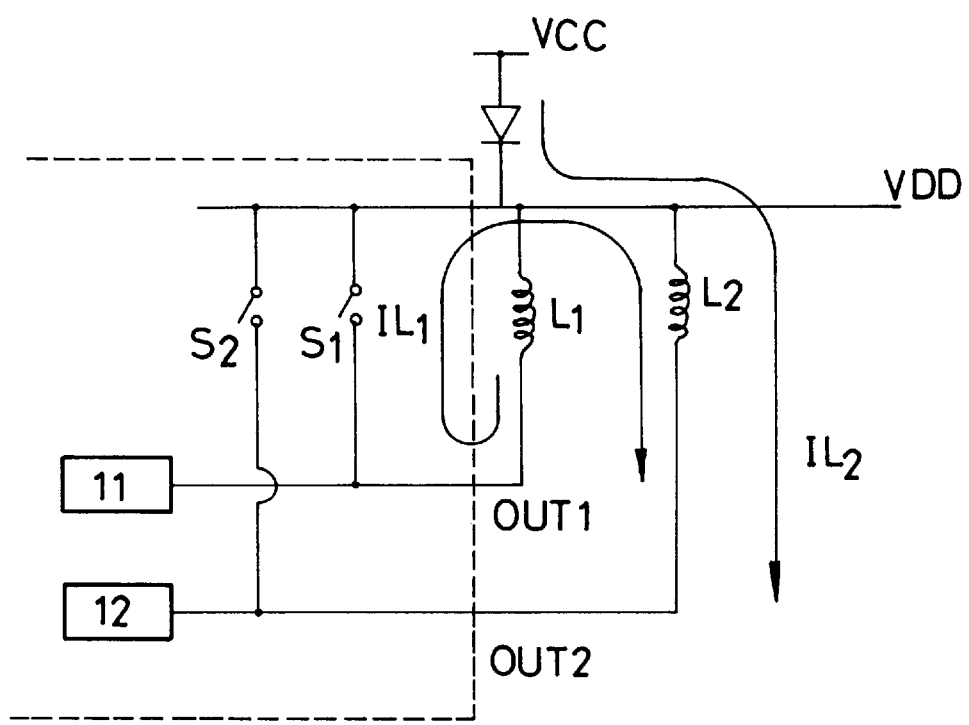
FIG. 3 illustrates the operation of the fan driver when electronic switches are used to implement the switch elements in FIG. 1.

With reference to FIG. 3, the switch elements K1 and K2 are implemented with electronic switches S1 and S2, respectively. Similar to the operation of the diodes D1 and D2 in FIG. 2, the switch elements K1 and K2 are alternatively closed and opened. That is, when driving unit 11 is turned off, electronic switch S1 is closed to transfer the anti-electromotive current IL1 to the other coil L2. On the other hand, when driving unit 12 is turned off, electronic switch S2 is closed to transfer the anti-electromotive current IL2 to the other coil L1.

Figure 4:
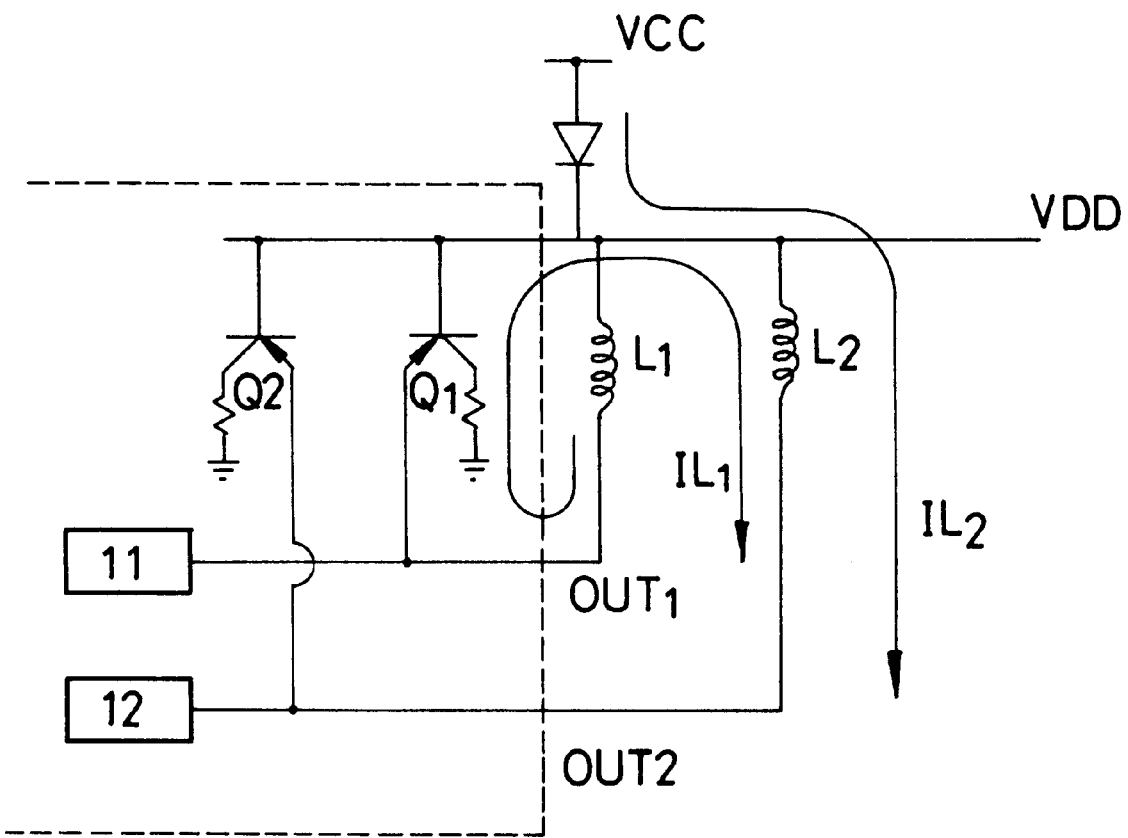
FIG. 4 illustrates the operation of the fan driver when transistors are used to implement the switch elements in FIG. 1.

With reference to FIG. 4, the switch elements K1 and K2 are implemented with PNP transistors Q1 and Q2, respectively. The emitters of the two transistors Q1 and Q2 are connected to the output terminals OUT1 and OUT2 of the two driving units (11, 12), respectively. The bases of the two transistors Q1 and Q2 are connected to the power source VDD and the collectors thereof are connected to ground via resistors. The operation of such an overshoot voltage arrangement is similar to the one using the diodes D1 and D2 as shown in FIG.2. Furthermore, switch elements K1 and K2 can be implemented by two PMOS transistors with their gates connected to VDD, drains connected to ground and sources connected to output terminals OUT1 and OUT2 of the two driving units (11, 12).

Figure 5:
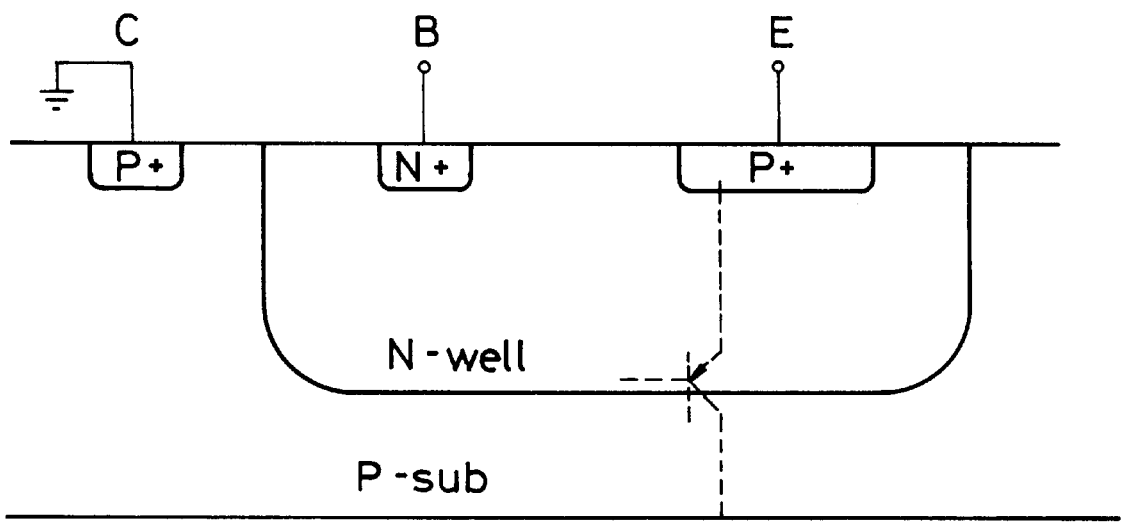
FIG. 5 shows the fabrication of a transistor in a CMOS device.

When the switch elements K1 and K2 are implemented by diodes or transistors, they can be fabricated together with the fan driver by a CMOS process. FIG. 5 shows how a PNP transistor is fabricated in a CMOS structure.

Figure 6:
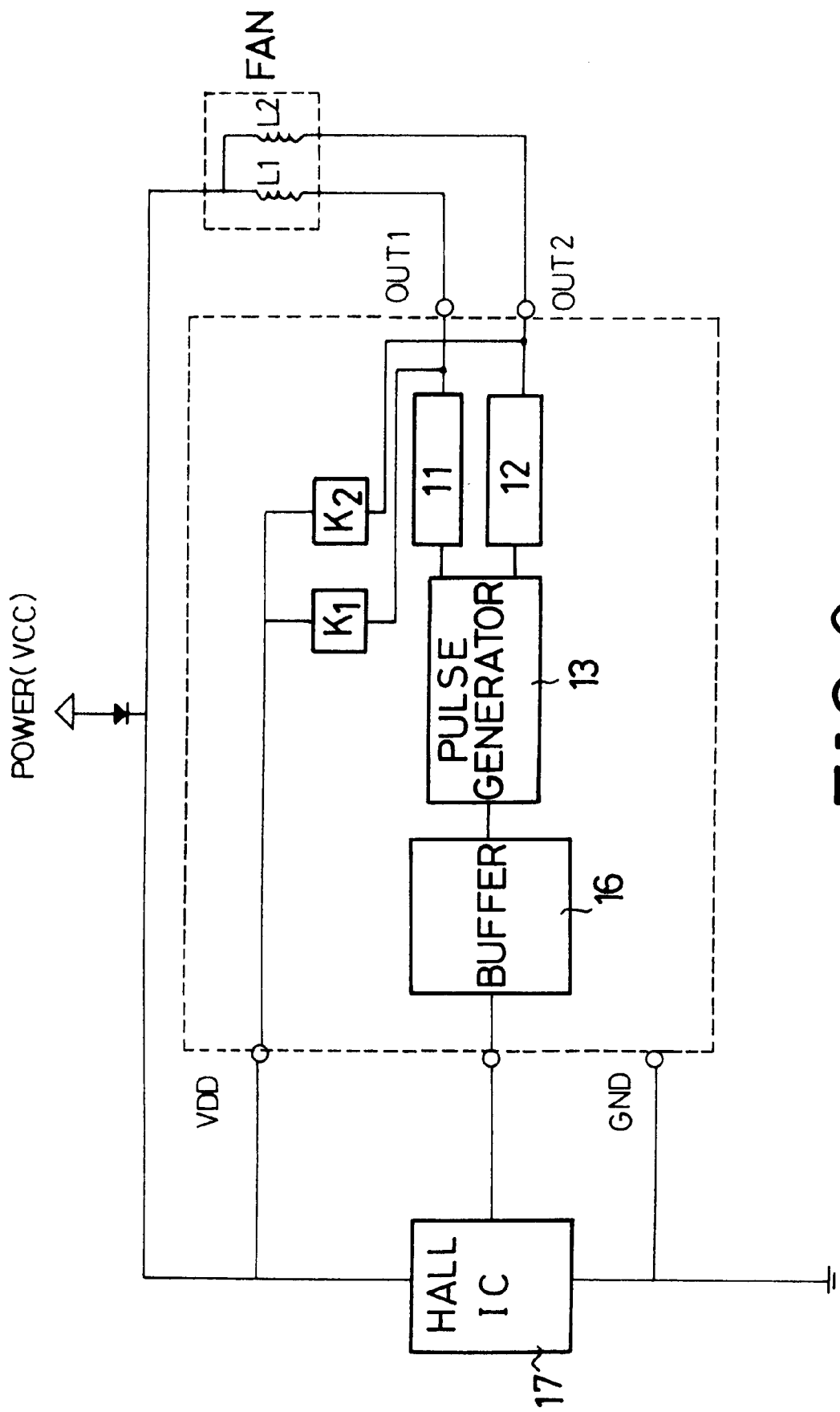
FIG. 6 is a circuit diagram of another preferred embodiment of the fan driver in accordance with the present invention.

Besides, as shown in FIG. 6, another preferred embodiment of the fan driver in accordance with the present invention is provided, which is similar to the one shown in FIG. 1 except that the Hall sensor (15) is replaced with a Hall IC (17) and a buffer (16) is connected between the Hall IC (17) and the pulse generator (13).

Figure 7:
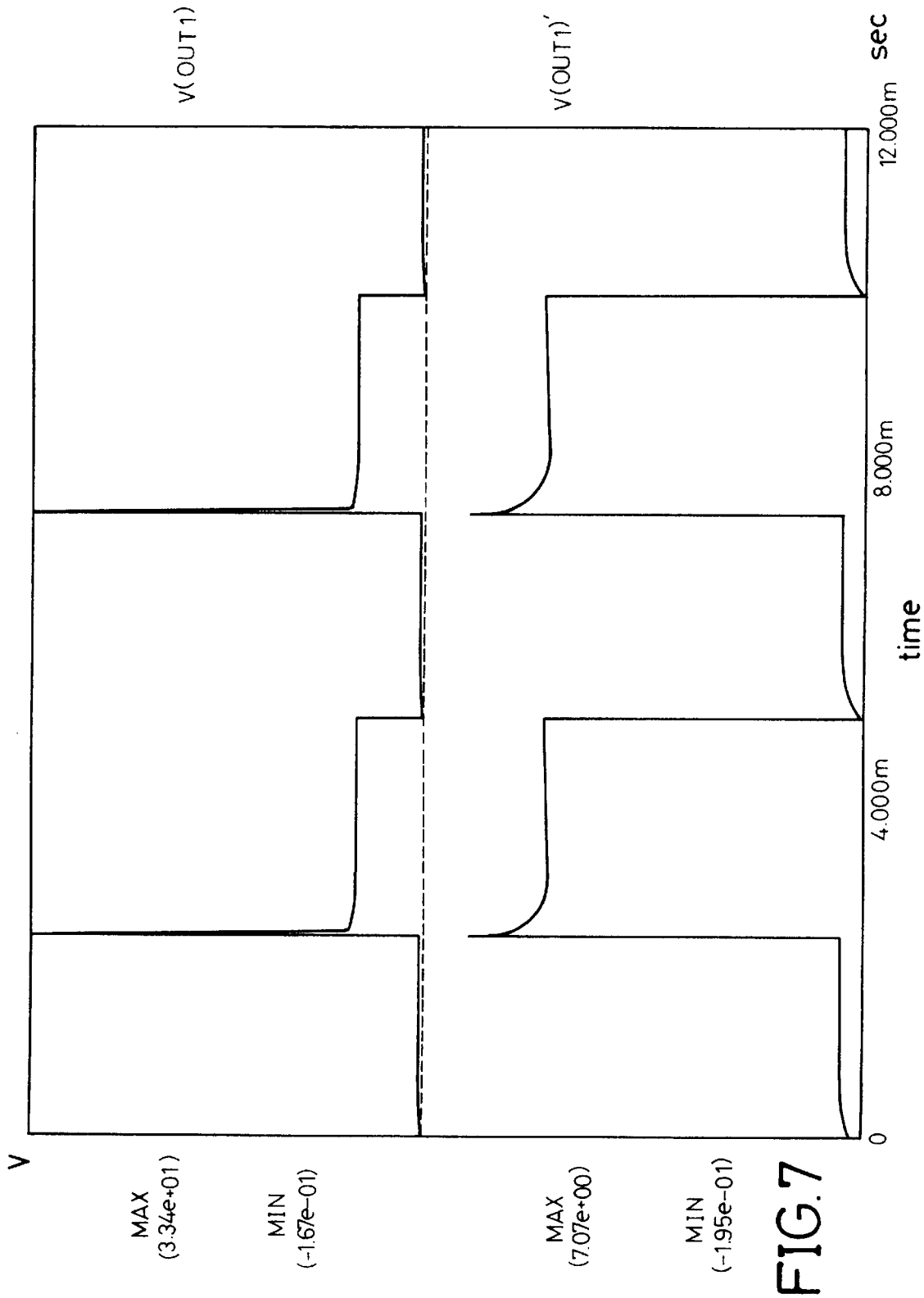
FIG. 7 is a SPICE simulation showing the output waveforms of a conventional fan driver and the fan driver in accordance with the present invention.
Figure 8:
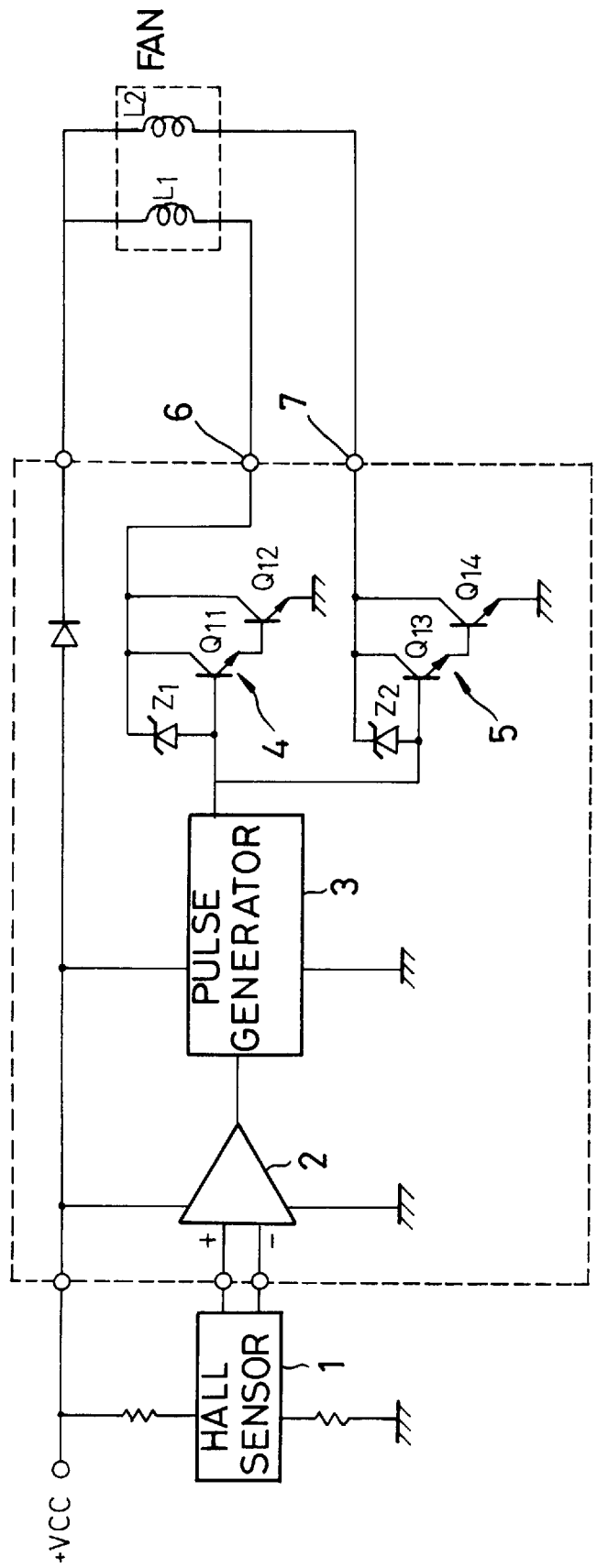
FIG. 8 is a circuit diagram of a conventional fan driver.

FIG. 7 is a SPICE simulation showing that the output voltage V(OUT1) could overshoot more than 25V if the fan driver is not provided with an overshoot voltage prevention arrangement. However, the overshoot voltage in the output voltage V(OUT1)' is smaller than 1V if the fan driver in accordance with the present invention is provided.

Although the present invention has been explained in relation to its preferred embodiment, it is to be understood that many other possible modifications and variations can be made without departing from the spirit and scope of the invention as hereinafter claimed.

What is claimed is:

1. A fan driver for driving a DC brushless fan having a first and a second coils (L1,L2) for generating magnetic fields to rotate a rotor of said fan, said fan driver comprising:
   a pulse generator (13) for receiving a signal indicating the phase of said rotor from a Hall element and generating a first and a second pulse signals whose phases are inverted by about 180°;
   a first and a second driving units (11,12) activated by said first and second pulse signals respectively, said first driving unit (11) having an output terminal (OUT1) adapted to connect to the first coil (L1) of said fan, said second driving unit (12) having an output terminal (OUT2) adapted to connect to the second coil (L2) of said fan, wherein said first and second driving units (11, 12) are alternatively turned on and off such that the first and second coils (L1, L2) of said fan are alternatively supplied with current thereby generating magnetic fields to rotate the rotor of said fan; and
   a first and a second switch elements (K1,K2), said first switch element (K1) being connected between the output terminal (OUT1) of said first driving unit (11) and a power source (VDD), said second switch element (K2) being connected between the output terminal (OUT2) of said second driving unit (K2) and said power source (VDD), whereby anti-electromotive voltage generated by one of said first and second coils (L1, L2) can be transferred to the other coil.

2. The fan driver as claimed in claim 1, wherein said Hall element is a Hall sensor (15) and said fan driver further comprises an amplifier (14) connected between said pulse generator (13) and said Hall sensor (15).

3. The fan driver as claimed in claim 1, wherein said Hall element is a Hall IC (17) and said fan driver further comprises a buffer (16) connected between said pulse generator (13) and said Hall IC (17).

4. The fan driver as claimed in claim 2, wherein each of said first and second switch elements (K1,K2) is implemented by a diode.

5. The fan driver as claimed in claim 2, wherein each of said first and second switch elements (K1,K2) is implemented by an electronic switch.

6. The fan driver as claimed in claim 2, wherein each of said first and second switch elements (K1,K2) is implemented by a PNP transistor with its emitter connected to the output terminal of a corresponding driving unit, base connected to the power source and collector connected to ground.

7. The fan driver as claimed in claim 2, wherein each of said first and second switch elements (K1, K2) is implemented by a PMOS transistor with its gate connected to the power source, drain connected to ground and source connected to the output terminal of a corresponding driving unit.

8. The fan driver as claimed in claim 3, wherein each of said first and second switch elements (K1, K2) is implemented by a diode.

9. The fan driver as claimed in claim 3, wherein each of said first and second switch elements (K1, K2) is implemented by an electronic switch.

10. The fan driver as claimed in claim 3, wherein each of said first and second switch elements (K1, K2) is implemented by a PNP transistor with its emitter connected to the output terminal of a corresponding driving unit, base connected to the power source and collector connected to ground.

11. The fan driver as claimed in claim 3, wherein each of said first and second switch elements (K1, K2) is implemented by a PMOS transistor with its gate connected to the power source, drain connected to ground and source connected to the output terminal of a corresponding driving unit.

* * * * *